US011595856B2

(12) United States Patent
Watanabe

(10) Patent No.: US 11,595,856 B2
(45) Date of Patent: Feb. 28, 2023

(54) NODE APPARATUS, METHOD, PROGRAM, AND RECORDING MEDIUM

(71) Applicant: NEC CORPORATION, Tokyo (JP)

(72) Inventor: Yoshinori Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 7 days.

(21) Appl. No.: 16/971,956

(22) PCT Filed: Feb. 7, 2019

(86) PCT No.: PCT/JP2019/004394
§ 371 (c)(1),
(2) Date: Aug. 21, 2020

(87) PCT Pub. No.: WO2019/171870
PCT Pub. Date: Sep. 12, 2019

(65) Prior Publication Data
US 2020/0396646 A1 Dec. 17, 2020

(30) Foreign Application Priority Data
Mar. 9, 2018 (JP) .............. JP2018-042768

(51) Int. Cl.
H04W 28/24 (2009.01)
H04W 84/04 (2009.01)
(Continued)

(52) U.S. Cl.
CPC .......... H04W 28/24 (2013.01); H04W 84/042 (2013.01); H04W 88/08 (2013.01); H04W 88/16 (2013.01); H04W 88/18 (2013.01)

(58) Field of Classification Search
CPC ... H04W 28/24; H04W 84/042; H04W 88/08; H04W 88/16; H04W 88/18
See application file for complete search history.

(56) References Cited

U.S. PATENT DOCUMENTS

2007/0121539 A1 5/2007 Kikuchi
2013/0142135 A1 6/2013 Wang
(Continued)

FOREIGN PATENT DOCUMENTS

| JP | 2013-527691 A | 6/2013 |
| JP | 2016-508296 A | 3/2016 |
| WO | 2005/039211 A1 | 4/2005 |

OTHER PUBLICATIONS

International Search Report for PCT/JP2019/004394 dated May 14, 2019 (PCT/ISA/210).

Primary Examiner — Wayne H Cai

(57) ABSTRACT

In order to suppress degradation of quality for each of services that share a radio resource, a base station 100 includes an information obtaining unit 141 configured to obtain information related to change request for quality requirement of a first service managed by a first management apparatus 400 involved in control for a radio resource of the base station 100, and a quality evaluation unit 143 configured to evaluate a quality change caused in a second service managed by a second management apparatus 500, the second service sharing the radio resource with the first service, in response to the change request for the quality requirement of the first service, to determine permission for the change request for the quality requirement of the first service.

10 Claims, 11 Drawing Sheets

(51) Int. Cl.
*H04W 88/08* (2009.01)
*H04W 88/16* (2009.01)
*H04W 88/18* (2009.01)

(56) References Cited

U.S. PATENT DOCUMENTS

| | | |
|---|---|---|
| 2015/0351118 A1 | 12/2015 | Arnott et al. |
| 2017/0272956 A1* | 9/2017 | Gu ........................ H04W 24/02 |
| 2017/0317894 A1* | 11/2017 | Dao ....................... H04W 28/24 |
| 2018/0338017 A1* | 11/2018 | Mekuria ................. H04L 69/04 |

* cited by examiner

NODE APPARATUS, METHOD, PROGRAM, AND RECORDING MEDIUM

CROSS REFERENCE TO RELATED APPLICATIONS

This application is a National Stage of International Application No. PCT/JP2019/004394 filed Feb. 7, 2019, claiming priority based on Japanese Patent Application No. 2018-042768, filed Mar. 9, 2018, the entire disclosures of which are incorporated herein.

BACKGROUND

Technical Field

The present invention relates to a node apparatus in a communication network, a method, a program, and a recording medium.

Background Art

A plurality of service providers provide services to a plurality of terminal apparatuses that share a radio resource. Each management apparatus of the individual service providers performs communication control for satisfying a quality of service (QoS) requirement of a corresponding service, on each communication apparatus such as a base station.

For example, PTL 1 describes a shared base station able to divide and share resources between a plurality of network operators. This shared base station divides resources of the shared base station into sets of resources reserved for individual network operators and resources shared by all network operators. This base station is configured to be monitored by each operator, for the usage of resources and to determine an appropriate prioritization of communication bearers associated with the network operators, for each scheduling round.

CITATION LIST

Patent Literature

[PTL 1] JP 2016-508296 T

SUMMARY

Technical Problem

However, in a case that a plurality of service providers are provided with a radio resource from the same network operator and a particular service provider, for example, a provider that provides a service from an edge of a mobile communication network (near a terminal apparatus) or the like, changes to a QoS requirement for a heavy use of a radio resource to perform communication control, the following inconvenience may occur. For example, a lack of radio resources for a service provided by another service provider that provides a service via a cloud network or the like may cause inacceptable degradation of QoS.

An example object of the present invention is to provide a node apparatus, a method, a program, and a recording medium that can suppress degradation of quality for each of services that share a radio resource.

Solution to Problem

According to an example aspect of the present invention, a node apparatus includes an information obtaining unit configured to obtain information related to change request for quality requirement of a first service managed by a first management apparatus involved in control for a radio resource of a base station, and a quality evaluation unit configured to evaluate a quality change caused in a second service managed by a second management apparatus, the second service sharing the radio resource with the first service, in response to the change request for the quality requirement of the first service, to determine permission for the change request for the quality requirement of the first service.

According to an example aspect of the present invention, a method includes obtaining information related to change request for quality requirement of a first service managed by a first management apparatus involved in control for a radio resource of a base station, and evaluating a quality change caused in a second service managed by a second management apparatus, the second service sharing the radio resource with the first service, in response to the change request for the quality requirement of the first service, to determine permission for the change request for the quality requirement of the first service.

According to an example aspect of the present invention, a program causes a processor to execute obtaining information related to change request for quality requirement of a first service managed by a first management apparatus involved in control for a radio resource of a base station, and evaluating a quality change caused in a second service managed by a second management apparatus, the second service sharing the radio resource with the first service, in response to the change request for the quality requirement of the first service, to determine permission for the change request for the quality requirement of the first service.

According to an example aspect of the present invention, a recording medium is a non-transitory computer-readable recording medium storing a program that causes a processor to execute obtaining information related to change request for quality requirement of a first service managed by a first management apparatus involved in control for a radio resource of a base station, and evaluating a quality change caused in a second service managed by a second management apparatus, the second service sharing the radio resource with the first service, in response to the change request for the quality requirement of the first service, to determine permission for the change request for the quality requirement of the first service.

Advantageous Effects of Invention

According to the present invention, it is possible to suppress degradation of quality for each of services that share a radio resource. Note that, according to the present invention, instead of or together with the above effects, other effects may be exerted.

DESCRIPTION OF THE EXAMPLE EMBODIMENTS

Figure 1:
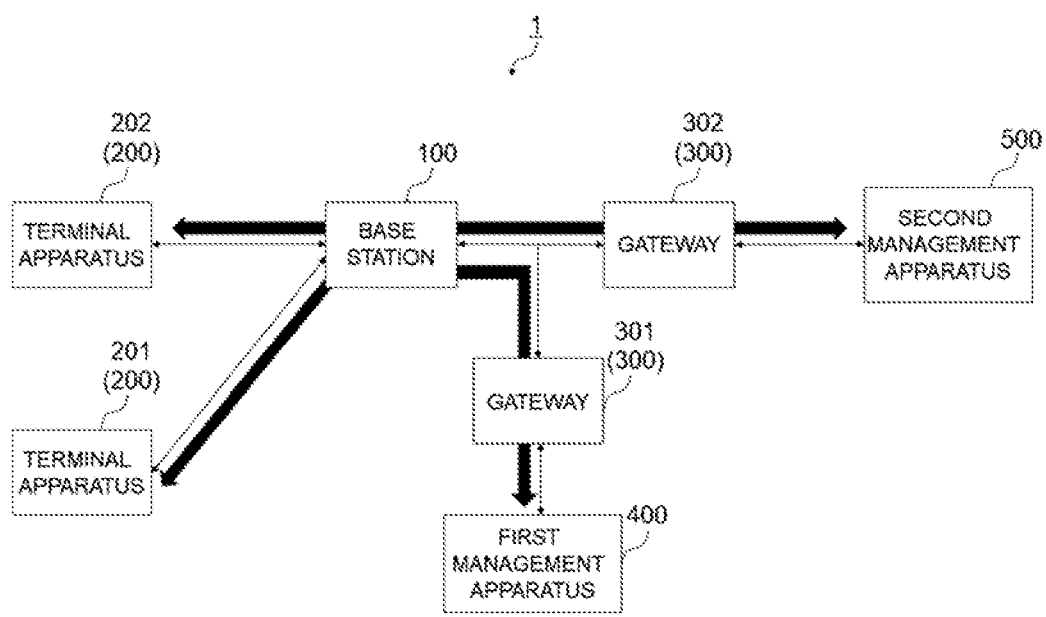
FIG. 1 is an explanatory diagram illustrating an example of a schematic configuration of a system 1 according to an example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. Configuration of System
3. First Example Embodiment
3.1. Configuration of Base Station 100
3.2. Technical Features
3.3. Examples
4. Second Example Embodiment
4.1. Configuration of First Management Apparatus 400
4.2. Technical Features
4.3. Example
5. Third Example Embodiment
5.1. Configuration of Second Management Apparatus 500
5.2. Technical Features
5.3. Examples
6. Fourth Example Embodiment
6.1. Configuration of Node Apparatus 600
6.2. Technical Features
7. Other Example Embodiments

1. Overview of Example Embodiments of the Present Invention

First, an overview of example embodiments of the present invention will be described.

(1) Technical Issues

A plurality of service providers provide services to a plurality of terminal apparatuses that share a radio resource. Each management apparatus of the individual service providers performs communication control for satisfying a quality of service (QoS) requirement of a service, on each communication apparatus such as a base station.

Specifically, a technique of QoS control using QoS class identifiers (QCIs) will be described. First, assume that traffics in different services are accommodated in the same network to share a radio resource. In this case, a regular QoS requirement (QCI) is configured for each service, and, for example, Policy and Charging Rules Function (PCRF) performs centralized control for QoS of communication. To services having the same QCI, QoS control based on fairness and system efficiency as reference is applied. In this case, the QoS for each radio section is managed by a communication provider.

Next, a technique of QoS control taking account of context will be described. First, assume that part of traffics in various services is terminated at an edge, and that individual services share a radio resource. In this case, even though the QCIs are the same, the management apparatuses of individual service providers perform distributed control on E2E QoS in consideration of QoS requirements and use states (contexts) of users. In this case, the service providers in addition to the communication operator are involved in management of QoS for each radio section.

However, in a case that a particular service provider, for example, a provider that provides a service from an edge of a mobile communication network (near a terminal apparatus), or the like changes to a QoS requirement for a heavy use of a radio resource to perform communication control, the following inconvenience may occur. For example, a lack of radio resources for a service provided by another service provider that provides a service via a cloud network or the like may cause inacceptable degradation of QoS.

In view of this, an example object of the present example embodiment is to make it possible to suppress degradation of quality for each of services that share a radio resource.

(2) Technical Features

In an example embodiment of the present invention, for example, information related to change request for quality requirement of a first service managed by a first management apparatus involved in control for a radio resource of a base station is obtained, and a quality change caused in a second service managed by a second management apparatus, the second service sharing the radio resource with the first service, is evaluated in response to the change request for the quality requirement of the first service, to determine permission for the change request for the quality requirement of the first service.

In this way, it is possible, for example, to suppress degradation of quality for each of services that share a radio resource.

Note that the above-described technical features are concrete examples of the example embodiments of the present invention, and the present example embodiments of the present invention are, of course, not limited to the above-described technical features.

2. Configuration of System

With reference to FIG. 1, an example of a configuration of a system 1 according to an example embodiment of the present invention will be described. FIG. 1 is an explanatory diagram illustrating an example of a schematic configuration of the system 1 according to the example embodiment of the present invention. With reference to FIG. 1, the system 1 includes a base station 100, terminal apparatuses 201 and 202 (referred to as a terminal apparatus 200 in a collective manner), gateways 301 and 302 (referred to as a gateway 300 in a collective manner), a first management apparatus 400, and a second management apparatus 500.

The system 1 is, for example, a system conforming to Third Generation Partnership Project (3GPP) standards/specifications. More specifically, for example, the system 1 may be a system conforming to LTE/LTE-Advanced and/or System Architecture Evolution (SAE) standards/specifications. Alternatively, the system 1 may be a system conforming to fifth-generation (5G)/New Radio (NR) standards/specifications. The system 1 is, of course, not limited to these examples.

(1) Base Station 100

The base station 100 is a radio access network (RAN) node and is configured to perform radio communication with terminal apparatuses (e.g., the terminal apparatuses 200) located in the coverage area of the base station 100.

For example, the base station 100 may be an evolved Node B (eNB) or a generation Node B (gNB) in 5G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Terminal Apparatus 200

Each terminal apparatus 200 performs radio communication with a base station. For example, the terminal apparatus 200 performs radio communication with the base station 100 in a case of being located in the coverage area of the base station 100. For example, the terminal apparatus 200 is a user equipment (UE).

(3) Gateway 300

The gateway 300 is, for example, a network node configured to transmit a signal or data between the base station 100 and a management apparatus. For example, the gateway 300 is an S/P-GW. More specifically, as illustrated in FIG. 1, the gateway 301 is connected to each of the base station 100 and the first management apparatus 400. The gateway 302 is connected to each of the base station 100 and the second management apparatus 500.

(4) First Management Apparatus 400

The first management apparatus 400 manages provision of the first service (for example, autonomous driving monitoring service or the like) to the terminal apparatus 200. Specifically, the first management apparatus 400 communicates with a terminal apparatus (for example, the terminal apparatus 201) mounted on a vehicle or a monitoring camera, via the gateway 301 and the base station 100, to thereby transmit and/or receive data related to the first service. The first management apparatus 400 is involved in control for a radio resource of the base station 100. For example, the first management apparatus 400 is a management apparatus based on mobile edge computing (MEC).

(5) Second Management Apparatus 500

The second management apparatus 500 manages provision of a second service (for example, video post service or the like) to the terminal apparatus 200. Specifically, the second management apparatus 500 communicates with a terminal apparatus (for example, the terminal apparatus 202) carried by a user who wants to post or watch a video, via the gateway 302 and the base station 100, to thereby transmit and/or receive data related to the second service.

3. First Example Embodiment

Next, a description will be given of a first example embodiment of the present invention with reference to FIGS. 2 to 4.

3.1. Configuration of Base Station 100

Figure 2:
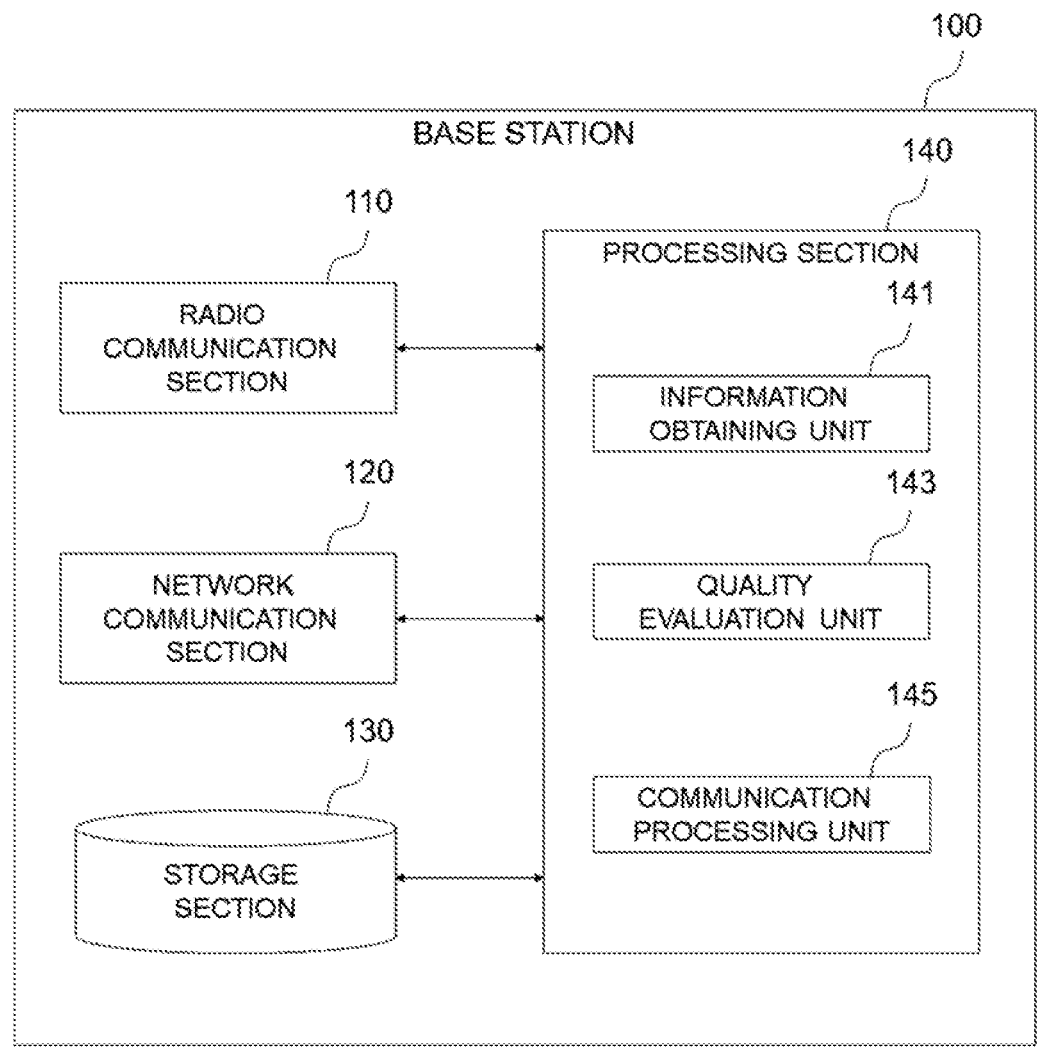
FIG. 2 is a block diagram illustrating an example of a schematic configuration of a base station 100 according to a first example embodiment.

With reference to FIG. 2, a description will be given of an example of a configuration of a base station 100 according to the first example embodiment. FIG. 2 is a block diagram illustrating an example of a schematic configuration of the base station 100 according to the first example embodiment. With reference to FIG. 2, the base station 100 includes a radio communication section 110, a network communication section 120, a storage section 130, and a processing section 140.

(1) Radio Communication Section 110

The radio communication section 110 wirelessly transmits and/or receives a signal. For example, the radio communication section 110 receives a signal from a terminal apparatus and transmits a signal to the terminal apparatus.

(2) Network Communication Section 120

The network communication section 120 receives a signal from a network and transmits a signal to the network.

(3) Storage Section 130

The storage section 130 temporarily or permanently stores programs (instructions) and parameters for operations of the base station 100 as well as various data. The program includes one or more instructions for operations of the base station 100.

(4) Processing Section 140

The processing section 140 provides various functions of the base station 100. The processing section 140 includes an information obtaining unit 141, a quality evaluation unit 143, and a communication processing unit 145. Note that the processing section 140 may further include constituent elements other than these constituent elements. In other words, the processing section 140 may also perform operations other than the operations of these constituent elements. Concrete operations of the information obtaining unit 141, the quality evaluation unit 143, and the communication processing unit 145 will be described later in detail.

For example, the processing section 140 (the communication processing unit 145) communicates with a terminal apparatus (e.g., the terminal apparatus 200) via the radio communication section 110. For example, the processing section 140 (the communication processing unit 145) communicates with each of the first management apparatus 400 and the second management apparatus 500 via another network node (for example, the gateway 300) via the network communication section 120.

(5) Implementation Example

The radio communication section 110 may be implemented with an antenna, a radio frequency (RF) circuit, and the like, and the antenna may be a directional antenna. The network communication section 120 may be implemented with a network adapter and/or a network interface card, and the like. The storage section 130 may be implemented with a memory (e.g., a nonvolatile memory and/or a volatile memory) and/or a hard disk, and the like. The processing section 140 may be implemented with one or more processors, such as a baseband (BB) processor and/or a different kind of processor. The information obtaining unit 141, the quality evaluation unit 143, and the communication processing unit 145 may be implemented with the same processor or may be implemented with separate processors. The memory (the storage section 130) may be included in the one or more processors or may be provided outside the one or more processors.

The base station 100 may include a memory configured to store a program (instructions) and one or more processors that can execute the program (instructions). The one or more processors may execute the program and thereby perform operations of the processing section 140 (operations of the information obtaining unit 141, the quality evaluation unit 143, and/or the communication processing unit 145). The program may be a program for causing the processor(s) to perform operations of the processing section 140 (operations of the information obtaining unit 141, the quality evaluation unit 143, and/or the communication processing unit 145).

Note that the base station 100 may be virtual. In other words, the base station 100 may be implemented as a virtual machine. In this case, the base station 100 (the virtual machine) may operate as a physical machine (hardware) including a processor, a memory, and the like, and a virtual machine on a hypervisor.

3.2. Technical Features

Next, technical features of the first example embodiment will be described.

The base station 100 (the information obtaining unit 141) obtains information related to change request for quality requirement of the first service managed by the first management apparatus 400 involved in control for a radio resource of the base station 100. The base station 100 (the quality evaluation unit 143) then evaluates a quality change caused in the second service managed by the second management apparatus 500, the second service sharing the radio resource with the first service, in response to the change request for the quality requirement of the first service, to determine permission for the change request for the quality requirement of the first service.

(1) Information Obtaining

The base station 100 (the information obtaining unit 141) obtains the information related to the change request for the quality requirement of the first service by receiving the information from the first management apparatus 400 via the gateway 301, for example.

Information Related to Quality of Second Service

The base station 100 (the information obtaining unit 141) may further obtain information related to quality of the second service. Specifically, the information related to the quality of the second service may include, for example, information related to the quality requirement of the second service obtainable from the second management apparatus 500.

The information related to the quality of the second service may include, for example, information related to quality statistics of the second service managed by the base station 100.

Further, the information related to the quality of the second service may include information related to an estimate of the quality of the second service in a case that the quality requirement of the first service is changed. The information related to the estimate is obtainable, for example, through estimation by the base station 100 (the information obtaining unit 141). Specifically, the base station 100 (the information obtaining unit 141) may include a quality estimation unit configured to estimate the estimate of the quality of the second service, based on a use state of the radio resource of the base station 100.

(2) Quality Evaluation

The base station 100 (the quality evaluation unit 143) evaluates a state of achievement of the quality change caused in the second service, in response to the change request for the quality requirement of the first service, based on the information related to the quality of the second service.

For example, the base station 100 (the quality evaluation unit 143) evaluates the quality change caused in the second service, in response to the change request for the quality requirement of the first service, based on the estimate of the quality of the second service. More specifically, the base station 100 (the quality evaluation unit 143) determines permission for the change request for the quality requirement of the first service, in a case that the estimate of the quality of the second service satisfies the quality requirement of the second service.

(3) Communication Control

The base station 100 (the communication processing unit 145) performs control for the radio resource of the base station in accordance with determination of permission of the change request for the quality requirement of the first service. Here, the control for the radio resource of the base station is, for example, changing radio resource allocation for the first service and the like.

(4) Location of Management Apparatus

For example, the first management apparatus 400 is located at an edge of a mobile communication network.

Meanwhile, the second management apparatus 500 is located in a cloud network connected via a mobile communication network.

3.3. Examples

Next, examples of the first example embodiment will be described with reference to FIGS. 3 and 4.

(1) First Example

Figure 3:
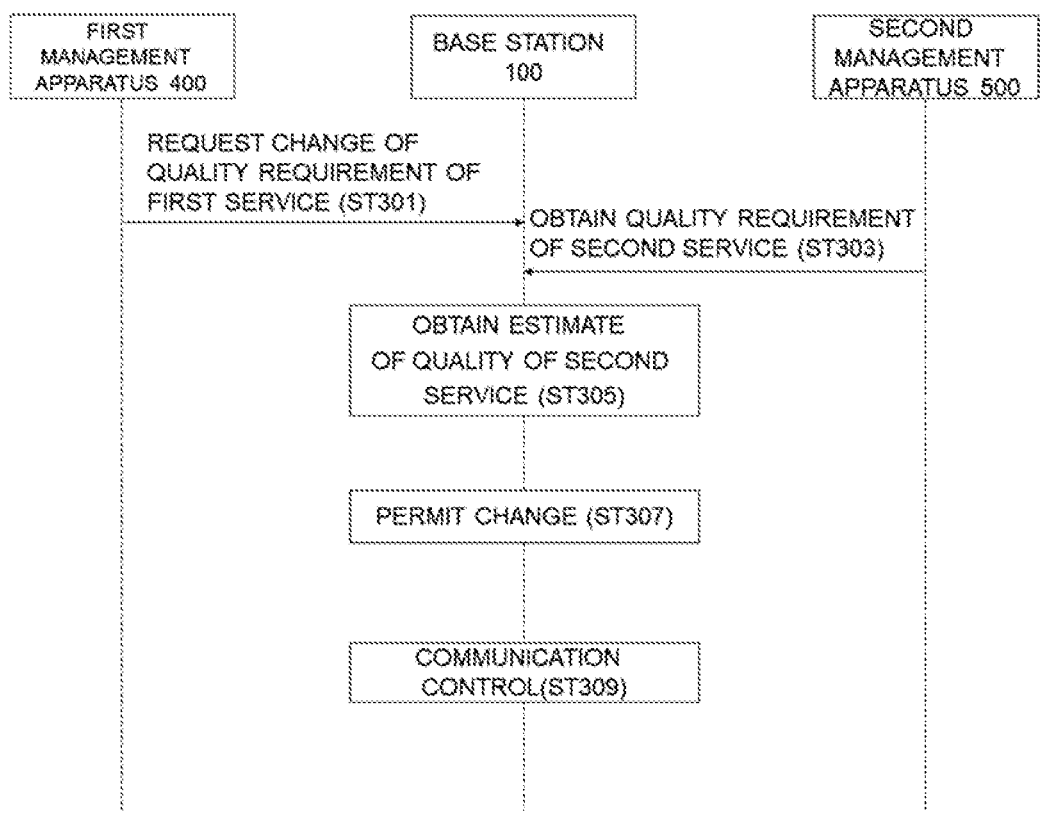
FIG. 3 is a sequence diagram for illustrating an example of a schematic flow of processing according to a first example of the first example embodiment.

FIG. 3 is a sequence diagram for illustrating an example of a schematic flow of processing according to a first example.

First, the first management apparatus 400 (a quality requirement change unit) requests the base station 100 (the quality evaluation unit 143) to permit a change of the quality requirement of the first service (step ST301). In this step, the first management apparatus 400 (the quality requirement change unit) may add, as detailed information related to the change, information related to an increase in throughput by XX Mbps, an increase in usage rate of resource blocks by XX points, and the like, for example.

Next, the base station 100 (the information obtaining unit 141) obtains, for example, the quality requirement of the second service from the second management apparatus 500 (a quality management unit) (step ST303). Here, the base station 100 (the information obtaining unit 141) may identify the destination (for example, the IP address) of the second management apparatus 500, based on management information of the operation maintenance system, the base station or the like. The base station 100 (the information obtaining unit 141) may obtain identification information of a provision target (for example, the terminal apparatus, the application, or the like) of the second service, from the second management apparatus 500.

Next, the base station 100 (the information obtaining unit 141) obtains, from the quality estimation unit, the estimate of the quality of the second service in a case that the change of the quality requirement of the first service is permitted (step ST305).

Here, the quality estimation unit derives an estimate of the quality of the second service in consideration of a use state of shared a radio resource, such as radio quality (a channel quality indicator (CQI)) between each of the terminal apparatuses (for example, the terminal apparatuses 201 and 202) sharing a radio resource and the base station 100, the usage rate of resource blocks.

For example, in a case that the contents of the change of the quality requirement of the first service is to "increase the throughput by XX %", the quality estimation unit can derive an estimate of the quality of the second service after the change is permitted, as follows.

Specifically, the quality estimation unit assumes, based on the change of the quality requirement of the first service, that the number of resource blocks necessary to be used for the first service is increased by XX %. Next, in a case that it is not possible to cover, by unused resource blocks, the increase of the number of resource blocks to be used by XX %, the quality estimation unit assumes that the resources in short are covered by reducing the number of resource blocks to be used for the second service under the control of the second management apparatus 500 by YY %. Further, the quality estimation unit assumes that the reduction of the number of resource blocks to be used by YY % consequently reduces the quality (for example, the throughput) of the second service under the control of the second management apparatus 500 by YY %. In other words, the quality estimation unit estimates an estimate of the quality of the second service after the change is permitted, to be the value obtained by reducing the latest quality of the second service by YY %.

Next, the base station 100 (the quality evaluation unit 143) permits the change of the quality requirement of the first service, in a case that the estimate of the quality of the second service satisfies the quality requirement of the second service (step ST307).

Here, in a case that a plurality of second management apparatuses 500 exist in the system 1, the base station 100 (the quality evaluation unit 143) may permit the change of the quality requirement of the first service only when the change is permitted to all the second management apparatuses 500, for example. The base station 100 (the quality evaluation unit 143) may determine that the change can be permitted when the rate of the second management apparatuses 500 which can be permitted the change exceeds a predetermined standard. In this case, a use state of the radio resource is evaluated for each second management apparatus 500 which is not permitted the change, in accordance with a predetermined operation policy, and the particular second management apparatus(es) 500 (for example, the second management apparatus(es) 500 with a usage rate of resource blocks for a target service exceeding a predetermined standard) may be excluded from targets to be considered in overall determination.

Lastly, when permission for the change of the quality requirement of the first service is obtained from the quality evaluation unit 143, the base station 100 (the communication processing unit 145) performs communication control for satisfying the quality requirement of the first service (step ST309). For example, when an increase in throughput and/or a reduction in allowable delay is requested, the base station 100 (the communication processing unit 145) increases resource blocks to be allocated for a target terminal apparatus (for example, the terminal apparatus 201). Note that the base station 100 (the communication processing unit 145) may notify the first management apparatus 400 (the quality requirement change unit) of a response to the permission for the change of the first service.

According to the processing illustrated in FIG. 3, it is possible to suppress degradation of quality for each of services sharing a radio resource, while reducing signaling between each management apparatus (for example, the first management apparatus 400 and the second management apparatus 500) and the base station 100.

(2) Second Example

Figure 4:
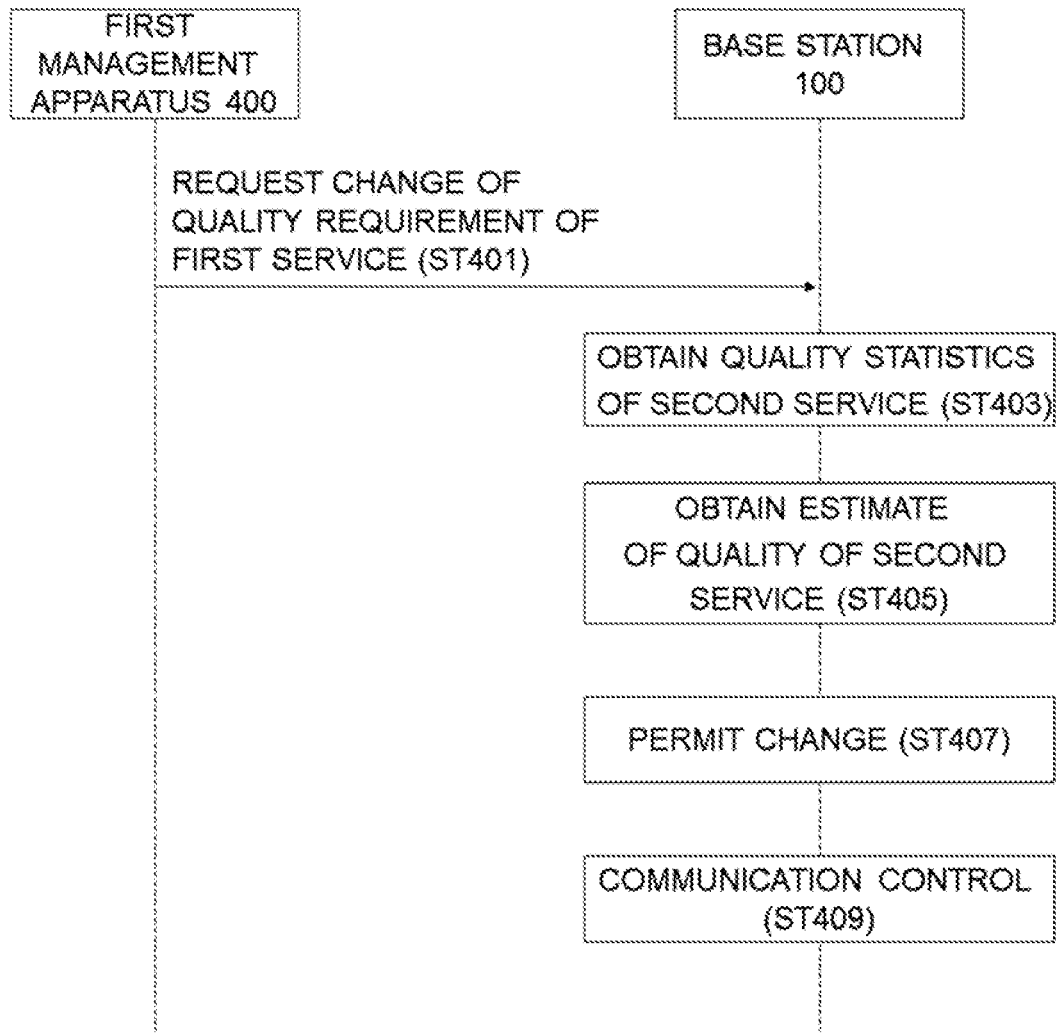
FIG. 4 is a sequence diagram for illustrating an example of a schematic flow of processing according to a second example of the first example embodiment.

FIG. 4 is a sequence diagram for illustrating an example of a schematic flow of processing according to a second example.

First, the first management apparatus 400 (the quality requirement change unit) requests the base station 100 to permit a change of the quality requirement of the first service (step ST401).

Next, the base station 100 (the information obtaining unit 141) obtains, for example, the quality statistics of the second service (for example, history information of service quality and/or the usage rate of resource blocks) from the quality management unit further included in the base station 100 (for example, the processing section 140) (step ST403).

Here, the quality management unit manages the quality statistics for each management apparatus (for example, the second management apparatus 500) for which identification information of a provision target (a terminal apparatus or an application) of the second service can be obtained. In this operation, the quality management unit may collectively manage the quality statistics of the management apparatuses for which identification information cannot be obtained. To obtain the quality statistics of a particular management apparatus from the quality management unit, the base station 100 (the information obtaining unit 141) may obtain the quality statistics having the desired management apparatus as a target of the statistics.

Next, the base station 100 (the quality evaluation unit 143) estimates the estimate of the quality statistics of the second service in a case that the change of the quality requirement of the first service is permitted, to thereby obtain the estimate (step ST405).

Next, the base station 100 (the quality evaluation unit 143) permits the change of the quality requirement of the first service, in a case that the estimate of the quality statistics of the second service satisfies a predetermined operation policy (step ST407).

Here, as the operation policy, for example, in a case that the average value of the quality statistics of the second service in a predetermined period in the past is within a predetermined range, the change of the quality requirement of the first service may be permitted. Alternatively, in a case that the estimate of the quality statistics of the second service after the change of the quality requirement of the first service is within a predetermined range with respect to the average value of the quality statistics of the second service in a predetermined period in the past, the change of the quality requirement of the first service may be permitted.

Lastly, when permission for the change of the quality requirement of the first service is obtained from the quality evaluation unit 143, the base station 100 (the communication processing unit 145) performs communication control for satisfying the quality requirement of the first service (step ST409). Note that the base station 100 (the communication processing unit 145) may notify the first management apparatus 400 (the quality requirement change unit) of a response to the permission for the change of the first service.

According to the processing illustrated in FIG. 4 described above, it is possible to suppress degradation of quality for each of services sharing a radio resource, without being in conjunction with part of management apparatuses sharing the radio resource (for example, the second management apparatus 500).

(3) Others

According to the above-described examples, application to social systems of various fields is possible such as autonomous driving of vehicles, automatic transporting vehicles in factories and warehouses, security robots, inspection robots at the time of disaster, and automated operation of drones for inspection and home delivery. In particular, it is possible to share peripheral information in real time by using mobile networks, and hence application to purposes for avoiding crashes to enable secure automated operation can be considered.

4. Second Example Embodiment

Next, a description will be given of a second example embodiment of the present invention with reference to FIGS. 5 and 6.

4.1. Configuration of First Management Apparatus 400

Figure 5:
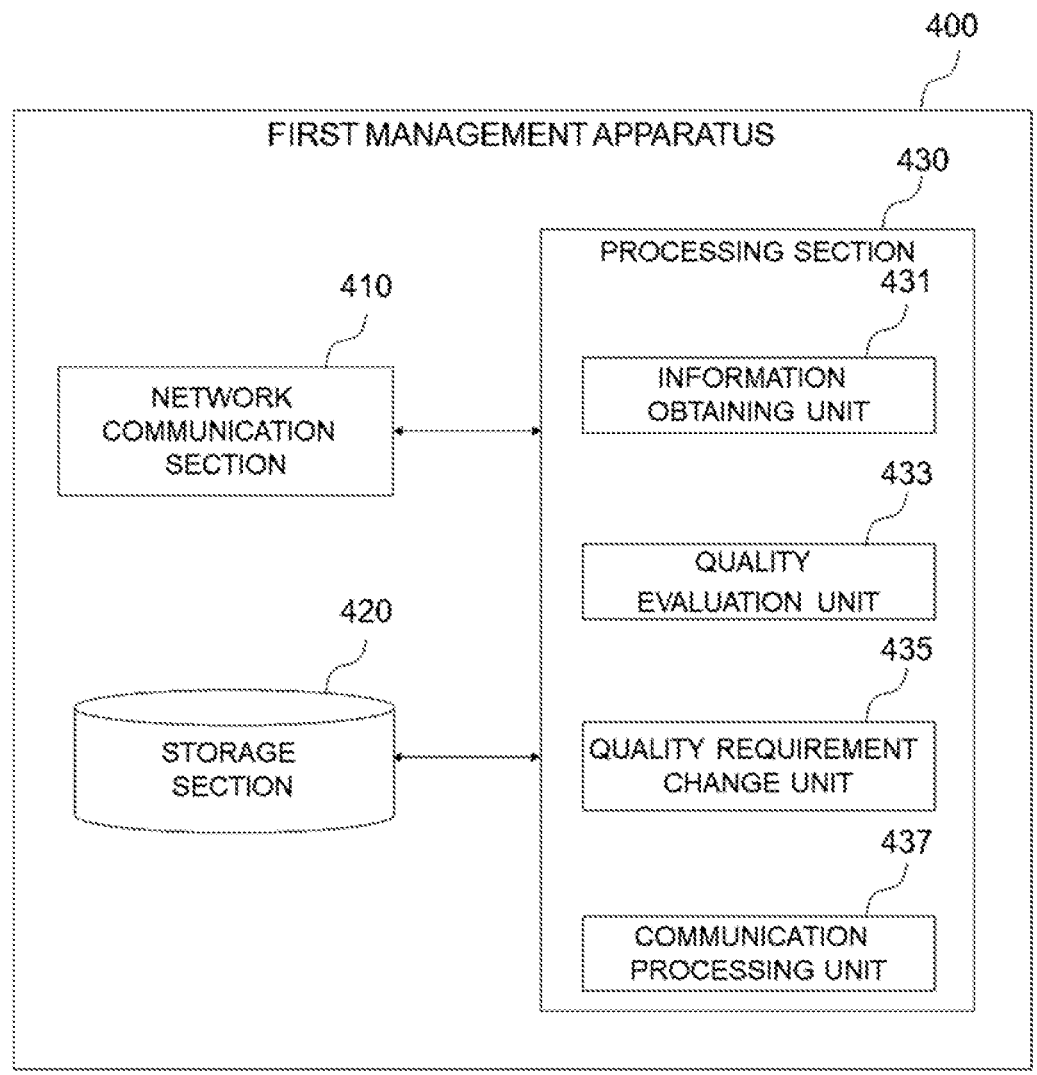
FIG. 5 is a block diagram illustrating an example of a schematic configuration of a first management apparatus 400 according to a second example embodiment.

With reference to FIG. 5, an example of a configuration of the first management apparatus 400 according to the second example embodiment will be described. FIG. 5 is a block diagram illustrating an example of a schematic configuration of the first management apparatus 400 according to the second example embodiment. With reference to FIG. 5, the first management apparatus 400 includes a network communication section 410, a storage section 420, and a processing section 430.

(1) Network Communication Section 410

The network communication section 410 receives a signal from a network and transmits a signal to the network.

(2) Storage Section 420

The storage section 420 temporarily or permanently stores programs (instructions) and parameters for operations of the first management apparatus 400 as well as various data. The program includes one or more instructions for the operations of the first management apparatus 400.

(3) Processing Section 430

The processing section 430 provides various functions of the first management apparatus 400. The processing section 430 includes an information obtaining unit 431, a quality evaluation unit 433, a quality requirement change unit 435, and a communication processing unit 437. Note that the processing section 430 may further include constituent elements other than these constituent elements. In other words, the processing section 430 may also perform operations other than the operations of these constituent elements. Concrete operations of the information obtaining unit 431, the quality evaluation unit 433, the quality requirement change unit 435, and the communication processing unit 437 will be described later in detail.

For example, the processing section 430 (the communication processing unit 437) communicates with the base station 100 via another network node (for example, the gateway 300) via the network communication section 410.

(4) Implementation Example

The network communication section 410 may be implemented with a network adapter and/or a network interface card, and the like. The storage section 420 may be implemented with a memory (e.g., a nonvolatile memory and/or a volatile memory) and/or a hard disk, and the like. The processing section 430 may be implemented with one or more processors, such as a baseband (BB) processor and/or a different kind of processor. The information obtaining unit 431, the quality evaluation unit 433, the quality requirement change unit 435, and the communication processing unit 437 may be implemented with the same processor or may be implemented with separate processors. The memory (the storage section 420) may be included in the one or more processors or may be provided outside the one or more processors.

The first management apparatus 400 may include a memory configured to store a program (instructions) and one or more processors that can execute the program (instructions). The one or more processors may execute the program and thereby perform operations of the processing section 430 (operations of the information obtaining unit 431, the quality evaluation unit 433, the quality requirement change unit 435, and/or the communication processing unit 437). The program may be a program for causing the processor(s) to perform operations of the processing section 430 (operations of the information obtaining unit 431, the quality evaluation unit 433, the quality requirement change unit 435, and/or the communication processing unit 437).

Note that the first management apparatus 400 may be virtual. In other words, the first management apparatus 400 may be implemented as a virtual machine. In this case, the first management apparatus 400 (virtual machine) may operate as a physical machine (hardware) including a processor, a memory, and the like, and a virtual machine on a hypervisor.

4.2. Technical Features

Next, technical features of the second example embodiment will be described.

The first management apparatus 400 (the information obtaining unit 431) obtains information related to change request for quality requirement of a first service managed by the first management apparatus 400 involved in control for a radio resource of the base station 100. The first management apparatus 400 (the quality evaluation unit 433) then evaluates a quality change caused in the second service managed by the second management apparatus 500, the second service sharing the radio resource with the first service, in response to the change request for the quality requirement of the first service, to determine permission for the change request for the quality requirement of the first service.

(1) Information Obtaining

The first management apparatus 400 (the information obtaining unit 431) obtains the information related to the change request for the quality requirement of the first service by receiving the information from the first management apparatus 400 (the quality requirement change unit 435), for example. In other words, the quality requirement change unit 435 performs the change request for the quality requirement of the first service.

Information Related to Quality of Second Service

The first management apparatus 400 (the information obtaining unit 431) may further obtain information related to quality of the second service. Specifically, the information related to the quality of the second service may include, for example, information related to the quality requirement of the second service obtainable from the second management apparatus 500. The information related to the quality of the second service may include, for example, information related to quality statistics of the second service managed by the base station 100.

Further, the information related to the quality of the second service may include information related to an estimate of the quality of the second service in a case that the quality requirement of the first service is changed. The information related to the estimate is obtainable, for example, through estimation by the first management apparatus 400 (the information obtaining unit 431). Specifically, the first management apparatus 400 (the information obtaining unit 431) may include a quality estimation unit configured to estimate the estimate of the quality of the second service, based on a use state of the radio resource of the base station 100.

(2) Quality Evaluation

The first management apparatus 400 (the quality evaluation unit 433) evaluates a state of achievement of the quality change caused in the second service, in response to the change request for the quality requirement of the first service, based on the information related to the quality of the second service.

For example, the first management apparatus 400 (the quality evaluation unit 433) evaluates the quality change caused in the second service, in response to the change request for the quality requirement of the first service, based on the estimate of the quality of the second service. More specifically, the first management apparatus 400 (the quality evaluation unit 433) determines permission for the change request for the quality requirement of the first service, in a case that the estimate of the quality of the second service satisfies the quality requirement of the second service.

(3) Location of Management Apparatus

For example, the first management apparatus 400 is located at an edge of a mobile communication network. Meanwhile, the second management apparatus 500 is located in a cloud network connected via a mobile communication network.

4.3. Example

Next, with reference to FIG. 6 and the like, an example of the second example embodiment will be described.

Figure 6:
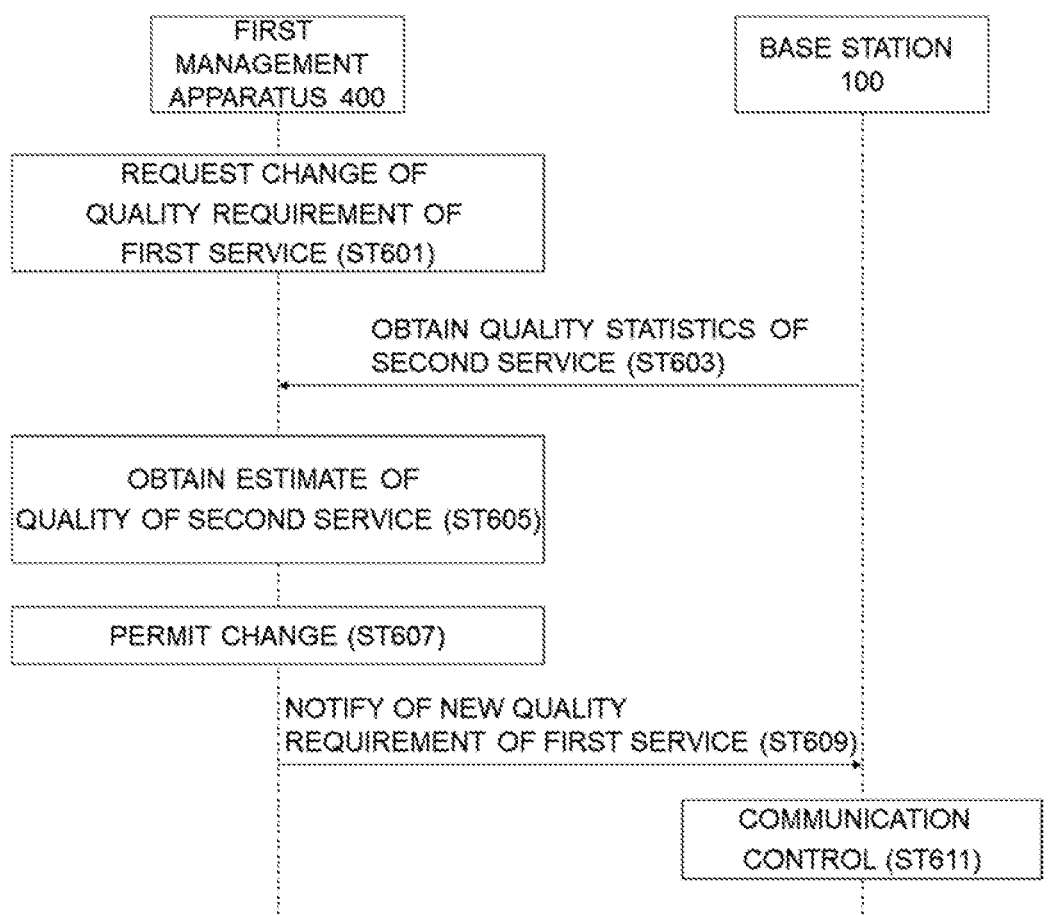
FIG. 6 is a sequence diagram for illustrating an example of a schematic flow of processing according to an example of the second example embodiment.

FIG. 6 is a sequence diagram for illustrating an example of a schematic flow of processing according to the example of the second example embodiment.

First, the first management apparatus 400 (the quality requirement change unit 435) requests the first management apparatus 400 (the information obtaining unit 431) to permit a change of the quality requirement of the first service (step ST601).

Next, the first management apparatus 400 (the information obtaining unit 431) receives, for example, quality statistics of the second service from the base station 100 (the quality management unit), to thereby obtain the quality statistics (step ST603).

Here, the base station 100 (the quality management unit) manages quality statistics for each management apparatus for which identification information of a management target (a terminal apparatus or an application) of the service quality can be obtained. The base station 100 (the quality management unit) also collectively manages the quality statistics of the management apparatuses for which identification information cannot be obtained. To obtain the quality statistics of a particular management apparatus from the base station 100 (the quality management unit), the first management apparatus 400 (the information obtaining unit 431) may obtain the quality statistics having the desired management apparatus as a target of the statistics.

The quality statistics may be compiled for each uplink/downlink or each CQI. As the quality statistics, for example, the number of active users, the usage rate of resource blocks, the total throughput, and the like may be obtained for all the terminal apparatuses connected to the base station. Alternatively, the quality statistics may be a compilation result of the average values or distributions of the throughput, the buffer residence time of the base station, CQI, the usage rate of resource blocks, and the like, of all the terminal apparatuses connected to the base station 100.

Next, the first management apparatus 400 (the information obtaining unit 431) estimates the estimate of the quality of the second service in a case that the change of the quality requirement of the first service is permitted, to thereby obtain the estimate (step ST605).

Next, the first management apparatus 400 (the quality evaluation unit 433) permits the change of the quality requirement of the first service, in a case that the estimate of the quality statistics of the second service satisfies a predetermined operation policy (step ST607). An operation policy used here is similar to that in the second example of the first example embodiment described above.

Next, when the change permission is gained from the first management apparatus 400 (the quality evaluation unit 433), the first management apparatus 400 (the quality requirement change unit 435) notifies the base station 100 (the communication processing unit) of a new quality requirement of the first service (step ST609). The information to be notified is, for example, a performance requirement value (such as throughput, allowable delay), reliability (the achievement rate of the request), and a request target (such as identification information of a service or a terminal). In a case that there exist a plurality of second management apparatuses 500, the base station 100 (the communication processing unit) may be notified of the new quality requirement of the first service only when all the second management apparatuses 500 are permitted the change.

Next, when receiving notification of the new quality requirement of the first service from the first management apparatus 400 (the quality requirement change unit 435), the base station 100 (the communication processing unit) performs communication control for satisfying the new quality requirement.

According to the processing illustrated in FIG. 6 above, it is possible, for example, to flexibly adjust the quality requirement of the first service while taking account of the use state of the first service managed by the first management apparatus 400.

According to the above-described example, application to social systems of various fields is possible such as autonomous driving of vehicles, automatic transporting vehicles in factories and warehouses, security robots, inspection robots at the time of disaster, and automated operation of drones for inspection and home delivery. In particular, it is possible to share peripheral information in real time by using mobile networks, and hence application to purposes for avoiding crashes to enable secure automated operation can be considered.

5. Third Example Embodiment

Next, a description will be given of a third example embodiment of the present invention with reference to FIGS. 7 to 10.

5.1. Configuration of Second Management Apparatus 500

Figure 7:
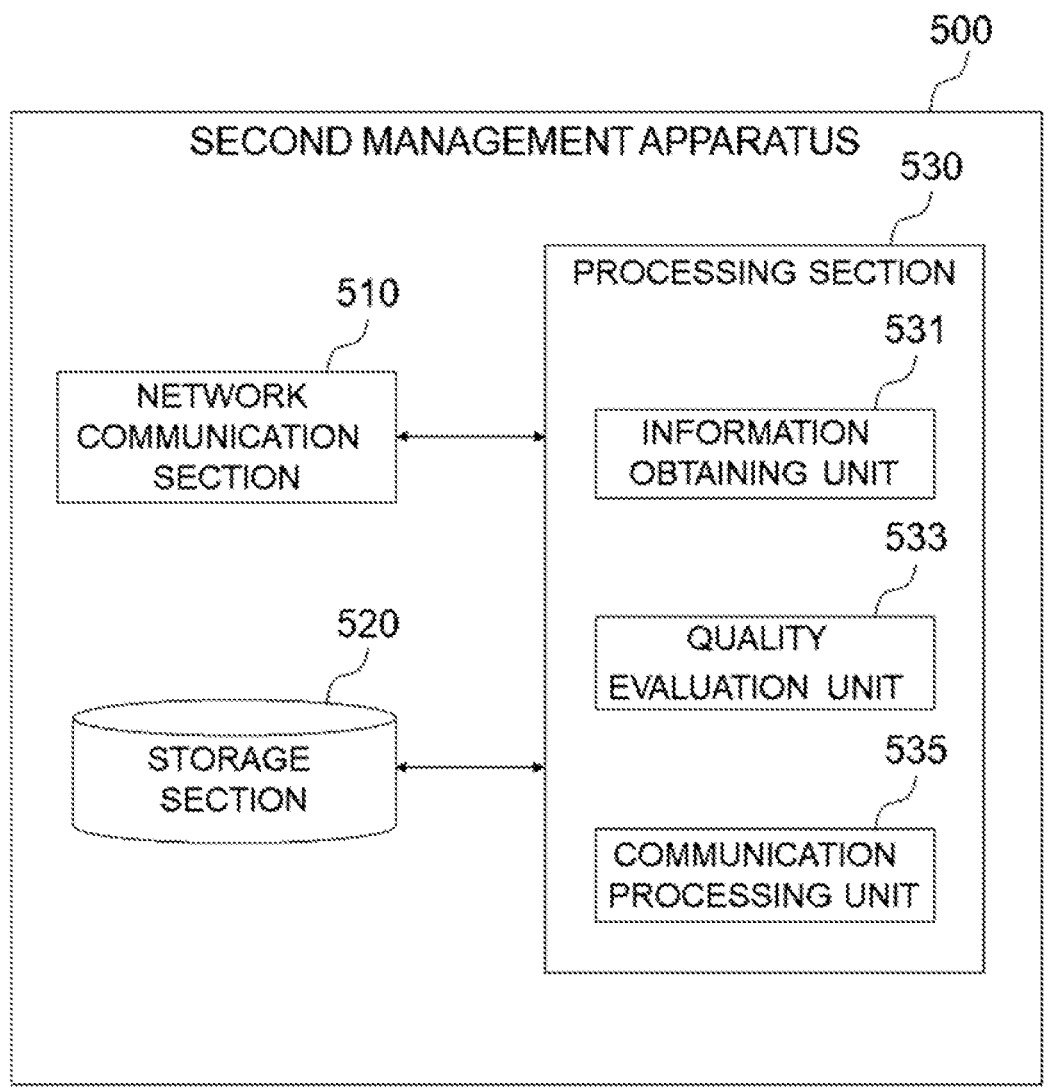
FIG. 7 is a block diagram illustrating an example of a schematic configuration of a second management apparatus 500 according to a third example embodiment.

With reference to FIG. 7, an example of a configuration of the second management apparatus 500 according to the third example embodiment will be described. FIG. 7 is a block diagram illustrating an example of a schematic configuration of the second management apparatus 500 according to the third example embodiment. With reference to FIG. 7, the second management apparatus 500 includes a network communication section 510, a storage section 520, and a processing section 530.

(1) Network Communication Section 510

The network communication section 510 receives a signal from a network and transmits a signal to the network.

(2) Storage Section 520

The storage section 520 temporarily or permanently stores programs (instructions) and parameters for operations of the second management apparatus 500 as well as various data. The program includes one or more instructions for the operations of the first management apparatus 400.

(3) Processing Section 530

The processing section 530 provides various functions of the second management apparatus 500. The processing section 530 includes an information obtaining unit 531, a quality evaluation unit 533, and a communication processing unit 535. Note that the processing section 530 may further include constituent elements other than these constituent elements. In other words, the processing section 530 may also perform operations other than the operations of these constituent elements. Concrete operations of the information obtaining unit 531, the quality evaluation unit 533, and the communication processing unit 535 will be described later in detail.

For example, the processing section 430 (the communication processing unit 535) communicates with each of the base station 100 and the first management apparatus 400 via another network node (for example, the gateway 300) via the network communication section 510.

(4) Implementation Example

The network communication section 510 may be implemented with a network adapter and/or a network interface card, and the like. The storage section 520 may be implemented with a memory (e.g., a nonvolatile memory and/or a volatile memory) and/or a hard disk, and the like. The processing section 530 may be implemented with one or more processors, such as a baseband (BB) processor and/or a different kind of processor. The information obtaining unit 531, the quality evaluation unit 533, and the communication processing unit 535 may be implemented with the same processor or may be implemented with separate processors. The memory (the storage section 520) may be included in the one or more processors or may be provided outside the one or more processors.

The second management apparatus 500 may include a memory configured to store a program (instructions) and one or more processors that can execute the program (instructions). The one or more processors may execute the program and thereby perform operations of the processing section 530 (operations of the information obtaining unit 531, the quality evaluation unit 533, and/or the communication processing unit 535). The program may be a program for causing the processor(s) to perform operations of the processing section 530 (operations of the information obtaining unit 531, the quality evaluation unit 533, and/or the communication processing unit 535).

Note that the second management apparatus 500 may be virtual. In other words, the second management apparatus 500 may be implemented as a virtual machine. In this case, the second management apparatus 500 (virtual machine) may operate as a physical machine (hardware) including a processor, a memory, and the like, and a virtual machine on a hypervisor.

5.2. Technical Features

Next, technical features of the third example embodiment will be described.

The second management apparatus 500 (the information obtaining unit 531) obtains information related to change request for quality requirement of a first service managed by the first management apparatus 400 involved in control for a radio resource of the base station 100. The second management apparatus 500 (the quality evaluation unit 533) then evaluates a quality change caused in the second service managed by the second management apparatus 500, the second service sharing the radio resource with the first service, in response to the change request for the quality requirement of the first service, to determine permission for the change request for the quality requirement of the first service.

(1) Information Obtaining

The second management apparatus 500 (the information obtaining unit 531) obtains the information related to the change request for the quality requirement of the first service by receiving the information from the first management apparatus 400 (the quality requirement change unit), for example.

Information Related to Quality of Second Service

The second management apparatus 500 (the information obtaining unit 531) may further obtain information related to quality of the second service. Specifically, the information related to the quality of the second service may include, for example, information related to the quality requirement of the second service obtainable from the second management apparatus 500. The information related to the quality of the second service may include, for example, information related to quality statistics of the second service managed by the second management apparatus 500.

Further, the information related to the quality of the second service may include information related to an estimate of the quality of the second service in a case that the quality requirement of the first service is changed. The information related to the estimate is obtainable, for example, through estimation by the base station 100.

(2) Quality Evaluation

The second management apparatus 500 (the quality evaluation unit 533) evaluates a state of achievement of the quality change caused in the second service, in response to the change request for the quality requirement of the first service, based on the information related to the quality of the second service.

For example, the second management apparatus 500 (the quality evaluation unit 533) evaluates the quality change caused in the second service, in response to the change request for the quality requirement of the first service, based on the estimate of the quality of the second service. More specifically, the second management apparatus 500 (the quality evaluation unit 533) determines permission for the change request for the quality requirement of the first service, in a case that the estimate of the quality of the second service satisfies the quality requirement of the second service.

(3) Location of Management Apparatus

For example, the first management apparatus 400 is located at an edge of a mobile communication network. Meanwhile, the second management apparatus 500 is located in a cloud network connected via a mobile communication network.

5.3. Examples

Next, with reference to FIGS. 8 to 10 and the like, examples of the third example embodiment will be described.

(1) First Example

Figure 8:
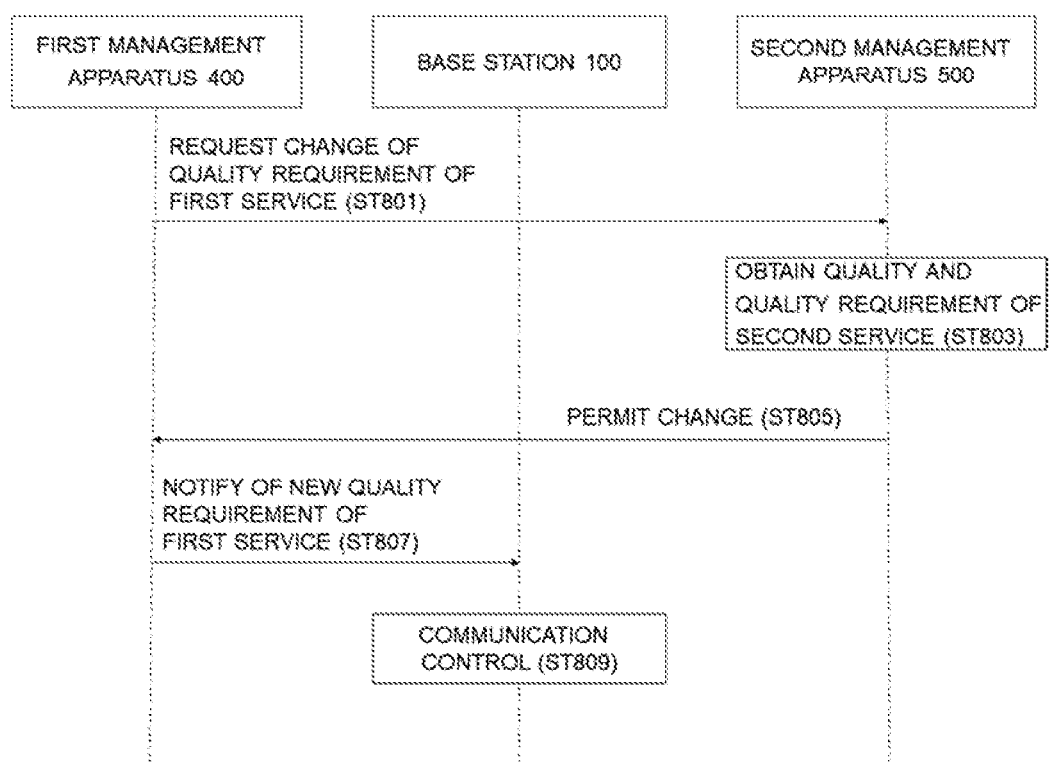
FIG. 8 is a sequence diagram for illustrating an example of a schematic flow of processing according to a first example of the third example embodiment.

FIG. 8 is a sequence diagram for illustrating an example of a schematic flow of processing according to a first example of the third example embodiment.

First, the second management apparatus 500 (the information obtaining unit 531) receives a change request for the quality requirement of the first service from the first management apparatus 400 (the quality requirement change unit), to thereby obtain the change request (step ST801).

Next, the second management apparatus 500 (the information obtaining unit 531) obtains the quality and the quality requirement of the second service under the control of the second management apparatus 500, from the quality management unit included in the second management apparatus 500 (the processing section 530) (step ST803).

Next, in a case that the achievement state of the quality requirement for the second service has a margin, the second management apparatus 500 (the quality evaluation unit 533) permits the change of the quality requirement of the second service and notifies the first management apparatus 400 (the quality requirement change unit) of information related to the permission (step ST805). For example, in a case that the quality (for example, the average throughput, the average delay, and/or the like) of the second service has achieved XX % or more above a required standard, the second management apparatus 500 (the quality evaluation unit 533) determines that the achievement state has a margin.

Next, when the change permission is notified from the second management apparatus 500 (the quality evaluation unit 533), the first management apparatus 400 (the quality requirement change unit) notifies the base station 100 (the communication processing unit) of a new quality requirement of the first service (step ST807). The information to be notified is, for example, a performance requirement value (such as throughput, allowable delay), reliability (the achievement rate of the request), and a request target (such as a service, identification information of a terminal). In a case that there exist a plurality of second management apparatuses 500, the base station 100 (the communication processing unit) may be notified of the new quality requirement of the first service only when all the second management apparatuses 500 are permitted the change.

Lastly, when receiving notification of the new quality requirement of the first service from the first management apparatus 400 (the quality requirement change unit), the base station 100 (the communication processing unit) performs communication control for satisfying the new quality requirement (step ST809). For example, when an increase in throughput and/or a reduction in allowable delay is requested, the base station 100 (the communication processing unit) increases resource blocks to be allocated for a target terminal apparatus.

In this way, with the processing illustrated in FIG. 8 above, it is possible to suppress degradation of quality for each of services that share a radio resource.

(2) Second Example

Figure 9:
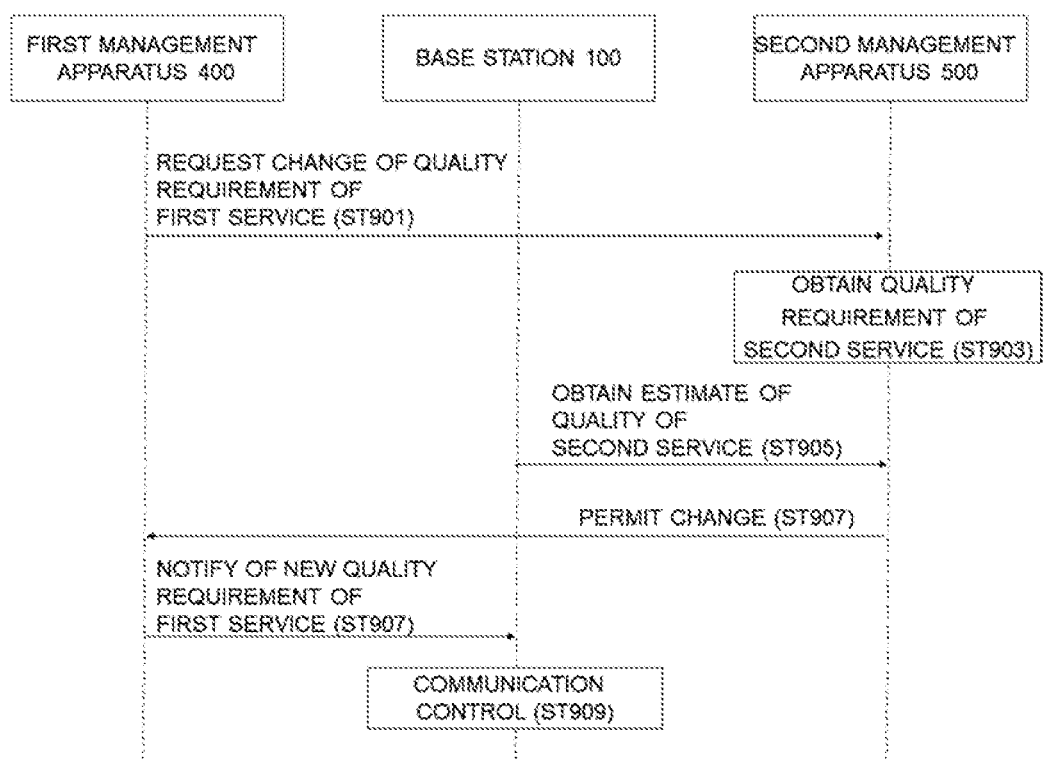
FIG. 9 is a sequence diagram for illustrating an example of a schematic flow of processing according to a second example of the third example embodiment.

FIG. 9 is a sequence diagram for illustrating an example of a schematic flow of processing according to a second example.

First, the second management apparatus 500 (the information obtaining unit 531) receives a change request for the quality requirement of the first service from the first management apparatus 400 (the quality requirement change unit), to thereby obtain the change request (step ST901).

Next, the second management apparatus 500 (the information obtaining unit 531) obtains the quality requirement of the second service under the control of the second management apparatus 500, from the quality management unit included in the second management apparatus 500 (the processing section 530) (step ST903).

Next, the second management apparatus 500 (the information obtaining unit 531) obtains, from the base station 100 (the quality estimation unit), an estimate of the quality of the second service in a case that the change of the quality requirement of the first service is permitted (step ST905).

Next, in a case that the estimate of the quality of the second service satisfies the quality requirement of the second service, the second management apparatus 500 (the quality evaluation unit 533) permits the change of the quality requirement of the first service and notifies the first management apparatus 400 (the quality requirement change unit) of information related to the permission (step ST907).

Lastly, when permission for the change of the quality requirement of the first service is obtained from the second management apparatus 500 (the quality evaluation unit 533), the base station 100 (the communication processing unit) performs communication control for satisfying the quality requirement of the first service (step ST909).

Thus, with the processing illustrated in FIG. 9 above, it is possible to grasp the influence of the change of the quality requirement of the first service on the quality of the second service, in consideration of the use state of shared a radio resource. In this way, with the processing illustrated in FIG. 9 above, it is possible to suppress degradation of quality for each of services that share a radio resource.

(3) Third Example

Figure 10:
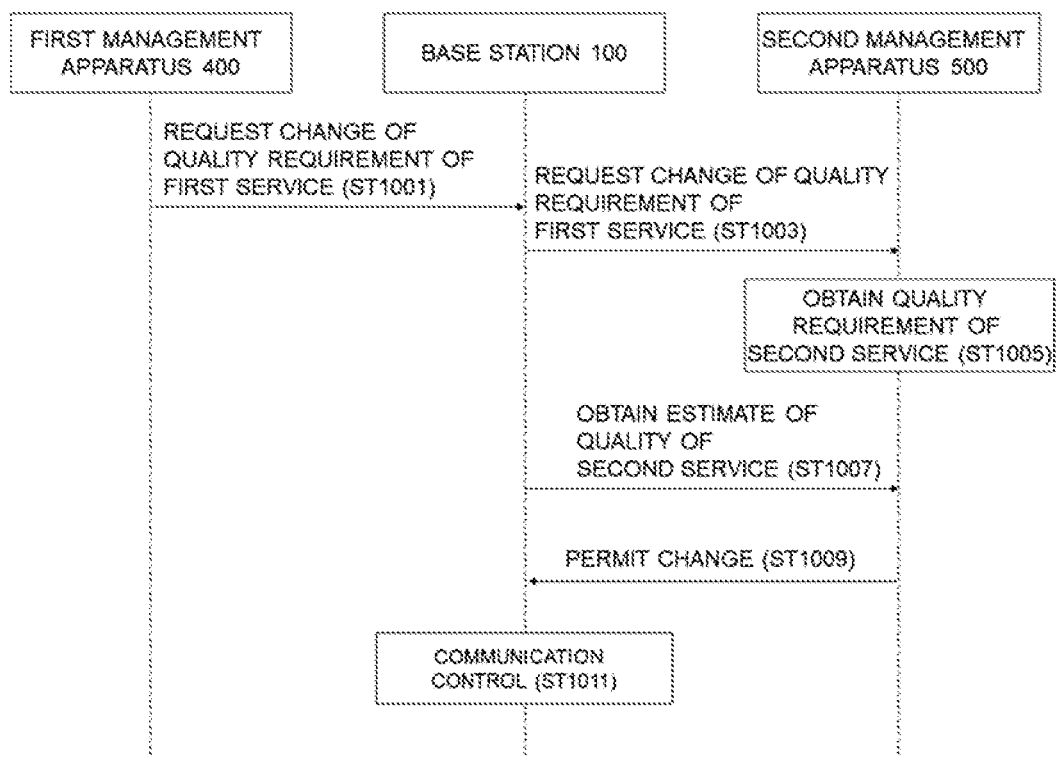
FIG. 10 is a sequence diagram for illustrating an example of a schematic flow of processing according to a third example of the third example embodiment.

FIG. 10 is a sequence diagram for illustrating an example of a schematic flow of processing according to a third example.

First, the first management apparatus 400 (the quality requirement change unit) performs change request for the quality requirement of the first service on the base station 100 (the communication processing unit) (step ST1001).

Next, the base station 100 (the communication processing unit) performs the change request for the quality requirement of the first service on the second management apparatus 500 (the information obtaining unit 531) (step ST1003).

Next, the second management apparatus 500 (the information obtaining unit 531) obtains the quality requirement of the second service under the control of the second management apparatus 500, from the quality management unit included in the second management apparatus 500 (the processing section 530) (step ST1005).

Next, the second management apparatus 500 (the information obtaining unit 531) obtains, from the base station 100 (the quality estimation unit), an estimate of the quality of the second service in a case that the change of the quality requirement of the first service is permitted (step ST1007).

Next, in a case that the estimate of the quality of the second service satisfies the quality requirement of the second service, the second management apparatus 500 (the quality evaluation unit 533) permits the change of the quality requirement of the first service and notifies the base station 100 (the communication processing unit) of information related to the permission (step ST1009). Note that the base station 100 may transmit the information related to the permission to the first management apparatus 400 (the quality requirement change unit).

Lastly, when permission for the change of the quality requirement of the first service is obtained from the second management apparatus 500 (the quality evaluation unit 533), the base station 100 performs communication control for satisfying the quality requirement of the first service (step ST1011).

Thus, with the processing illustrated in FIG. 10 above, it is not necessary to establish a communication connection between the first management apparatus 400 and the second management apparatus 500. Hence, with the processing illustrated in FIG. 10 above, it is possible to suppress degradation of quality for each of services that share a radio resource while easily improving security management.

(4) Others

According to the above-described examples, application to social systems of various fields is possible such as autonomous driving of vehicles, automatic transporting vehicles in factories and warehouses, security robots, inspection robots at the time of disaster, and automated operation of drones for inspection and home delivery. In particular, it is possible to share peripheral information in real time by using mobile networks, and hence application to purposes for avoiding crashes to enable secure automated operation can be considered.

6. Fourth Example Embodiment

Figure 11:
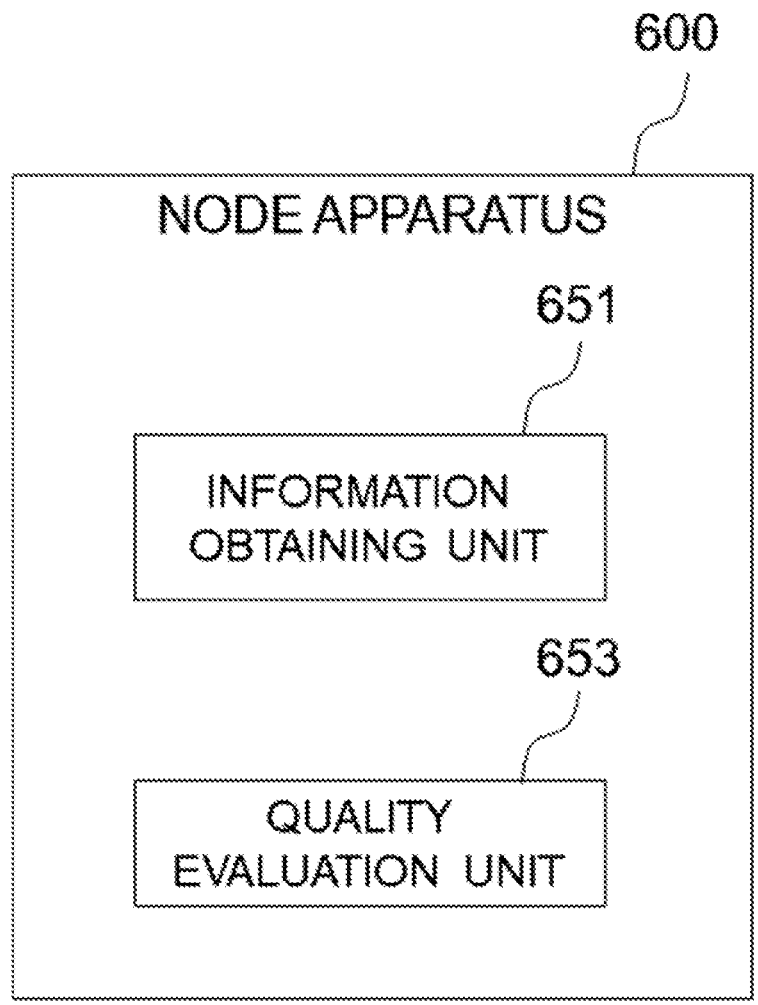
FIG. 11 is a block diagram illustrating an example of a schematic configuration of a node apparatus 600 according to a fourth example embodiment.

Next, a description will be given of a fourth example embodiment of the present invention with reference to FIG. 11. The above-described first to third example embodiments are concrete example embodiments, whereas the fourth example embodiment is a more generalized example embodiment.

6.1. Configuration of Node Apparatus 600

First, with reference to FIG. 11, an example of a configuration of a node apparatus 600 according to the fourth example embodiment will be described. FIG. 11 is a block diagram illustrating an example of a schematic configuration of the node apparatus 600 according to the fourth example embodiment. With reference to FIG. 11, the node apparatus 600 includes an information obtaining unit 651 and a quality evaluation unit 653. Concrete operations of the information obtaining unit 651 and the quality evaluation unit 653 will be described later.

The information obtaining unit 651 and the quality evaluation unit 653 may be implemented with the same processor or may be implemented with separate processors. The information obtaining unit 651 and the quality evaluation unit 653 may include a memory configured to store a program (instructions) and one or more processors that can execute the program (instructions), and the one or more processors may perform operations of the information obtaining unit 651 and the quality evaluation unit 653. The program may be a program for causing the processor(s) to perform operations of the information obtaining unit 651 and the quality evaluation unit 653.

Note that each of the processors described above may be, for example, a virtual processor implemented with a hypervisor installed in a general-purpose computer or the like. Each of the memories described above may be, for example, a virtual memory implemented with a hypervisor installed in a general-purpose computer or the like.

6.2. Technical Features

Next, technical features of the fourth example embodiment will be described.

In the fourth example embodiment, the node apparatus 600 (the information obtaining unit 651) obtains information related to change request for quality requirement of the first service managed by the first management apparatus 400 involved in control for a radio resource of the base station 100. The node apparatus 600 (the quality evaluation unit 653) then evaluates a quality change caused in the second service managed by the second management apparatus 500, the second service sharing the radio resource with the first service, in response to the change request for the quality requirement of the first service, to determine permission for the change request for the quality requirement of the first service.

For example, the information obtaining unit 651 may perform the operations of the information obtaining unit 141 according to the first example embodiment described above, the information obtaining unit 431 according to the second example embodiment described above, or the information obtaining unit 531 according to the third example embodiment described above. The quality evaluation unit 653 may perform the operations of the quality evaluation unit 143 according to the first example embodiment described above, the quality evaluation unit 433 according to the second example embodiment described above, or the quality evaluation unit 533 according to the third example embodiment described above.

The fourth example embodiment has been described above. According to the fourth example embodiment, it is possible, for example, to suppress degradation of quality for each of services that share a radio resource.

7. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus including constituent elements (e.g., the information obtaining unit and/or the quality evaluation unit) of the node apparatus (e.g., the base station, the first management apparatus, or the second management apparatus) described in the Specification (e.g., one or more apparatuses (or units) among a plurality of apparatuses (or units) constituting the node apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A node apparatus comprising:

an information obtaining unit configured to obtain information related to change request for quality requirement of a first service managed by a first management apparatus involved in control for a radio resource of a base station; and a quality evaluation unit configured to evaluate a quality change caused in a second service managed by a second management apparatus, the second service sharing the radio resource with the first service, in response to the change request for the quality requirement of the first service, to determine permission for the change request for the quality requirement of the first service.

(Supplementary Note 2)

The node apparatus according to Supplementary Note 1, wherein the information obtaining unit is configured to further obtain information related to quality of the second service, and the quality evaluation unit is configured to evaluate the quality change caused in the second service in response to the change request for the quality requirement of the first service, based on the information related to the quality of the second service, to determine permission for the change request for the quality requirement of the first service.

(Supplementary Note 3)

The node apparatus according to Supplementary Note 2, wherein the information related to the quality of the second service includes information related to an estimate of the quality of the second service in case that the quality requirement of the first service is changed, and the quality evaluation unit is configured to evaluate the quality change caused in the second service in response to the change request for the quality requirement of the first service, based on the estimate of the quality of the second service, to determine permission for the change request for the quality requirement of the first service.

(Supplementary Note 4)

The node apparatus according to Supplementary Note 3, wherein the information related to the quality of the second service further includes information related to quality requirement of the second service, and the quality evaluation unit is configured to determine permission for the change request for the quality requirement of the first service, in case that the estimate of the quality of the second service satisfies the quality requirement of the second service.

(Supplementary Note 5)

The node apparatus according to Supplementary Note 3 or 4, wherein the information obtaining unit is configured to include a quality estimation unit configured to estimate the estimate of the quality of the second service based on a use state of the radio resource.

(Supplementary Note 6)

The node apparatus according to Supplementary Note 5, further comprising a communication processing unit configured to perform control for the radio resource of the base station in accordance with determination of permission of the change request for the quality requirement of the first service.

(Supplementary Note 7)

The node apparatus according to Supplementary Note 3 or 4, wherein the information obtaining unit is configured to obtain the information related to an estimate of the quality of the second service by receiving the information from the base station.

(Supplementary Note 8)

The node apparatus according to Supplementary Note 7, further comprising a quality requirement change unit configured to perform the change request for the quality requirement of the first service.

(Supplementary Note 9)

The node apparatus according to any one of Supplementary Notes 1 to 8, wherein the first management apparatus is located at an edge of a mobile communication network.

(Supplementary Note 10)

The node apparatus according to any one of Supplementary Notes 1 to 9, wherein the second management apparatus is disposed in a cloud network connected via a mobile communication network.

(Supplementary Note 11)

A method comprising:

obtaining information related to change request for quality requirement of a first service managed by a first management apparatus involved in control for a radio resource of a base station; and evaluating a quality change caused in a second service managed by a second management apparatus, the second service sharing the radio resource with the first service, in response to the change request for the quality requirement of the first service, to determine permission for the change request for the quality requirement of the first service.

(Supplementary Note 12)

A program that causes a processor to execute:

obtaining information related to change request for quality requirement of a first service managed by a first management apparatus involved in control for a radio resource of a base station; and evaluating a quality change caused in a second service managed by a second management apparatus, the second service sharing the radio resource with the first service, in response to the change request for the quality requirement of the first service, to determine permission for the change request for the quality requirement of the first service.

(Supplementary Note 13)

A non-transitory computer-readable recording medium storing a program that causes a processor to execute:

obtaining information related to change request for quality requirement of a first service managed by a first management apparatus involved in control for a radio resource of a base station; and evaluating a quality change caused in a second service managed by a second management apparatus, the second service sharing the radio resource with the first service, in response to the change request for the quality requirement of the first service, to determine permission for the change request for the quality requirement of the first service.

INDUSTRIAL APPLICABILITY

In a mobile communication system, it is possible to suppress degradation of quality for each of services that share a radio resource.

REFERENCE SIGNS LIST

1 System
100 Base Station
200, 201, 202 Terminal Apparatus
300, 301, 302 Gateway
400 First Management Apparatus
500 Second Management Apparatus
141, 431, 531 Information Obtaining Unit
143, 433, 533 Quality Evaluation Unit
145, 437, 535 Communication Processing Unit
435 Quality Requirement Change Unit

What is claimed is:

1. A node apparatus comprising:

a memory storing instructions; and one or more processors configured to execute the instructions to:

obtain information related to a change request for a Quality of Service (QoS) requirement of a first application service over an Internet Protocol (IP) layer managed by a first management apparatus involved in control for a radio resource of a base station;

further obtain information related to a QoS of a second application service; and evaluate a QoS change caused in the second application service over an IP layer managed by a second management apparatus, the second application service sharing the radio resource with the first application service, in response to the change request for the QoS requirement of the first application service, based on the information related to the QoS of the second application service, to determine permission for the change request for the QoS requirement of the first application service, wherein the information related to the QoS of the second application service includes information related to an estimate obtained by reducing pre-change QoS of the second application service in response to increase of QoS of the first application service caused by the QoS requirement; and the one or more processors are configured to execute the instructions to evaluate the QoS change based on the estimate of the QoS of the second application service.

2. The node apparatus according to claim 1, wherein
the information related to the QoS of the second application service further includes information related to a QoS requirement of the second application service, and
the one or more processors are configured to execute the instructions to determine the permission for the change request for the QoS requirement of the first application service, in case that the estimate of the QoS of the second application service satisfies the QoS requirement of the second application service.

3. The node apparatus according to claim 1, wherein the one or more processors are configured to execute the instructions to estimate the estimate of the QoS of the second application service based on a use state of the radio resource.

4. The node apparatus according to claim 3, wherein the one or more processors are configured to execute the instructions to further perform control for the radio resource of the base station in accordance with determination of the permission of the change request for the QoS requirement of the first application service.

5. The node apparatus according to claim 1, wherein the one or more processors are configured to execute the instructions to obtain the information related to the estimate of the QoS of the second application service by receiving the information from the base station.

6. The node apparatus according to claim 5, wherein the one or more processors are configured to execute the instructions to further perform the change request for the QoS requirement of the first application service.

7. The node apparatus according to claim 1, wherein the first management apparatus is located at an edge of a mobile communication network.

8. The node apparatus according to claim 1, wherein the second management apparatus is disposed in a cloud network connected via a mobile communication network.

9. A method comprising:
obtaining information related to a change request for a QoS requirement of a first application service over an Internet Protocol (IP) layer managed by a first management apparatus involved in control for a radio resource of a base station;
obtaining information related to a QoS of a second application service; and
evaluating a QoS change caused in the second application service over an IP layer managed by a second management apparatus, the second application service sharing the radio resource with the first application service, in response to the change request for the QoS requirement of the first application service, based on the information related to the QoS of the second application service, to determine permission for the change request for the QoS requirement of the first application service, wherein
the information related to the QoS of the second application service includes information related to an estimate obtained by reducing pre-change QoS of the second application service in response to increase of QoS of the first application service caused by the QoS requirement; and
the evaluating includes evaluating the QoS change based on the estimate of the QoS of the second application service.

10. A non-transitory computer-readable recording medium storing a program that causes a processor to execute:
obtaining information related to a change request for a QoS requirement of a first application service over an Internet Protocol (IP) layer managed by a first management apparatus involved in control for a radio resource of a base station;
obtaining information related to a QoS of a second application service; and
evaluating a QoS change caused in the second application service over an IP layer managed by a second management apparatus, the second application service sharing the radio resource with the first application service, in response to the change request for the QoS requirement of the first application service, based on the information related to the QoS of the second application service, to determine permission for the change request for the QoS requirement of the first application service, wherein
the information related to the QoS of the second application service includes information related to an estimate obtained by reducing pre-change QoS of the second application service in response to increase of QoS of the first application service caused by the QoS requirement; and
the evaluating includes evaluating the QoS change based on the estimate of the QoS of the second application service.

* * * * *